United States Patent [19]
Scanlan

[11] Patent Number: 6,029,245
[45] Date of Patent: Feb. 22, 2000

[54] DYNAMIC ASSIGNMENT OF SECURITY PARAMETERS TO WEB PAGES

[75] Inventor: Thomas K. Scanlan, Raleigh, N.C.

[73] Assignee: International Business Machines Corporation, Armonk, N.Y.

[21] Appl. No.: 08/823,172

[22] Filed: Mar. 25, 1997

[51] Int. Cl.[7] .................................................. G06F 12/14
[52] U.S. Cl. ........................ 713/200; 713/201; 709/227; 709/228; 709/203; 380/49
[58] Field of Search ........................... 380/3, 4, 5, 23–25, 380/48–49; 395/186, 187.01, 188.01, 200.57–200.58, 200.33, 200.78–200.8

[56] References Cited

U.S. PATENT DOCUMENTS

| | | | |
|---|---|---|---|
| 5,237,610 | 8/1993 | Gammie et al. | 380/10 |
| 5,388,244 | 2/1995 | Brent et al. | 395/400 |
| 5,423,003 | 6/1995 | Berteau | 395/200.01 |
| 5,483,596 | 1/1996 | Rosenow et al. | 380/25 |
| 5,657,390 | 8/1997 | Elgamal et al. | 380/49 |
| 5,710,883 | 1/1998 | Hong et al. | 395/200.17 |
| 5,740,361 | 4/1998 | Brown | 395/187.01 |
| 5,778,367 | 7/1998 | Wesinger et al. | 707/10 |
| 5,793,964 | 8/1998 | Rogers et al. | 395/200.32 |
| 5,802,518 | 9/1998 | Karaev et al. | 707/9 |

OTHER PUBLICATIONS

IBM Technical Disclosure Bulletin (vol. 38 No. 10 Oct. 1995).
IBM Technical Disclosure Bulletin (vol. 31 No. 11 Apr. 1989).

*Primary Examiner*—Ayaz R. Sheikh
*Assistant Examiner*—Raymond N Phan
*Attorney, Agent, or Firm*—Steven J. Meyers; Steven J. Soucar; Gunster, Yoakley, Valdes-Fauli & Stewart, P.A.

[57] ABSTRACT

A method and means are provided for dynamically assigning security parameters to hypertext markup language (HTML) pages of an information provider on the worldwide web, whereby only one set of HTML pages need be stored and maintained for retrieval by client computers using differing security protocols. A security injection profile is provided for storing security parameters for each respective security protocol. When a browser enabled with a particular security protocol requests one of the HTML pages in the secure set, the page is accessed from web server storage, security parameters of the particular protocol are accessed and injected into the accessed page, and the page is sent to the requesting browser.

13 Claims, 4 Drawing Sheets

*Fig. 3*

```
<to name=Home.html   header=DEFAULT cryptopts=DEFAULT>
<from name=A.html    header=H1      cryptopts=C1>
</to>
<to name=A.html   header=DEFAULT cryptopts=DEFAULT>
</to>
<to name=B.html   header=DEFAULT cryptopts=DEFAULT>
<from name=Home.html header=H2      cryptopts=C2>
</to>

<header name=DEFAULT>
SHTTP-Privacy-Enhancements:   orig-optional=sign,encrypt
</header>
<cryptopts name=DEFAULT>
SHTTP-Privacy-Enhancements:   orig-optional=sign,encrypt
</cryptopts>
<cryptopts name=C1>
SHTTP-Privacy-Enhancements:   orig-optional=sign,encrypt,auth;
                recv-required=sign,encrypt;
                recv-optional=sign,auth
</cryptopts>
<header name=H1>
SHTTP-Privacy-Enhancements:   orig-optional=sign,encrypt,auth;
                recv-required=sign,encrypt;
                recv-optional=sign,auth
</header>
<cryptopts name=C2>
SHTTP-Privacy-Enhancements:   orig-optional=sign,encrypt,auth;
                recv-required=sign,encrypt;
                recv-optional=sign,auth
</cryptopts>
<header name=H2>
SHTTP-Privacy-Enhancements:   orig-optional=sign,encrypt,auth;
                recv-required=sign,encrypt;
                recv-optional=sign,auth
</header>
```

DYNAMIC ASSIGNMENT OF SECURITY PARAMETERS TO WEB PAGES

BACKGROUND OF THE INVENTION

1. Field of the Invention

This invention relates to dynamically assigning security parameters to Hypertext Markup Language (HTML) pages of a website owner's information content.

2. Description of the Background Art

Over the past few years, the internet has experienced phenomenal growth, both in the number of computers on the internet and in the number of people using them. Leading the way in this growth is the worldwide web, and the application which made this possible is the web browser, a point-and-click front end to the internet. The development of Hypertext Transfer Protocol (HTTP) made it possible to create "hypertext" documents with embedded links to other sites and other documents, and the browsers enabled the average person to "surf the Net," which was previously done only by computer experts. Not only was the technology available, it was given away for free, either by browser developers or by companies providing dial-up access to the internet.

One result of the web's rapid growth is that most web information content is free and not secure. Almost anyone can access almost anything, including the files stored on web servers which are located outside protective firewalls. This is a problem for a business which wants to set up a storefront on the web because security is required before customers will feel comfortable doing transactions such as processing a credit card purchase or an electronic funds transfer.

New products are becoming available which add security to web servers and browsers, and website owners must incorporate the new security technology. Part of this effort involves modifying the Hypertext Markup Language (HTML) that makes up the content of web pages in a way that is specific to the security technology being used. The result is that site owners have to maintain multiple versions of the same HTML pages, one set of pages for each security technology supported. Also, this requires web users to obtain new security enabled browsers to view these HTML pages. As the number of security technologies increases, so too will the number of browsers increase to take advantage of the advancements. This requirement to upgrade is a burden on the user community, and the maintenance of multiple sets of HTML pages is a burden on website owners.

The great majority of sites currently on the worldwide web do not incorporate any security measures. As new products become available which support security standards such as Secure Hypertext Transfer Protocol (SHTTP) and Secure Sockets Layer (SSL), website owners will need to add new security technology to their web pages while not denying access to the millions of internet users, all of whom are potential customers who have backlevel (nonsecure and/or secure) browsers. It is possible but undesirable to maintain multiple sets of HTML pages, one for each type of security protocol. This application describes a tool that enables a company, e.g., a website owner, to maintain a single set of HTML pages which can be served to a variety of browsers.

It is therefore an important object of the present invention to provide a method and means that permit a worldwide web information provider to maintain only one set of HTML pages which can be served to browsers enabled with differing security protocols.

It is another important object of the present invention to dynamically assign security parameters to an HTML page when it is accessed via a user browser request to a web server, whereby only one set of HTML pages need to stored for access by browsers with differing security protocols.

SUMMARY OF THE INVENTION

In the worldwide web system, a method and means for dynamically assigning security parameters to each one of a secure set of Hypertext Markup Language (HTML) pages as they are accessed, comprising the steps of or means for:

storing information in the form of HTML pages;

providing a security injection profile defining the level of security for said pages in accordance with a specific security protocol;

providing a browser enabled with said security protocol for requesting a particular one of the HTML pages via a hyperlink to said one page;

invoking a security injection program for accessing said one page, for accessing the security injection profile to obtain security parameters defined in the profile for said one page, and for adding said security parameters to said accessed one page; and delivering said one page to the browser.

In accordance with these and other objects which will become apparent hereinafter, the instant invention will now be described with particular reference to the accompanying drawings.

BRIEF DESCRIPTION OF THE DRAWINGS

FIG. 3 shows one example of a web security injection profile for a web information provider having three HTML pages and using the SHTTP transfer protocol.

DESCRIPTION OF THE PREFERRED EMBODIMENTS

Figure 1:
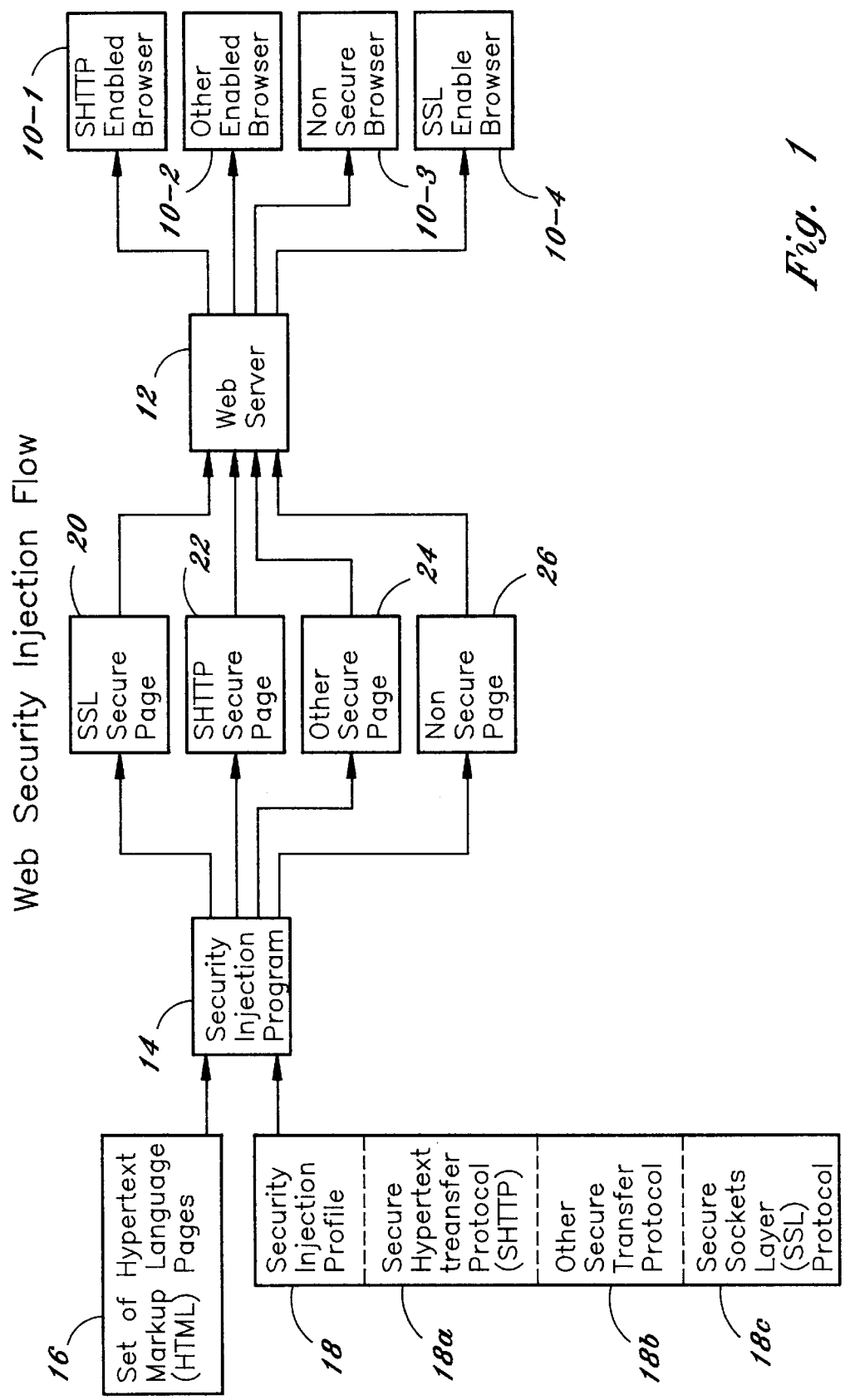
FIG. 1 is a block diagram illustrating the web security injection flow process of the present invention.

Before describing the present invention in detail, a brief description of accessing documents on the worldwide web will be made.

Hypertext Transfer Protocol (HTTP) is an application-level protocol with the lightness and speed necessary for distributed, collaborative, hypermedia information systems. HTTP has been in use by the worldwide web global information initiative since 1990.

The HTTP protocol is based on a request/response paradigm. A client establishes a connection with a server and sends a request to the server in the form of a request method, Universal Resource Identifier (URL), and protocol version. This is followed by a Multipurpose Internet Mail Extension (MIME) like message containing the request modifiers, client information, and possible body content. The server responds with a status line, including the message's protocol version and a success or error code, followed by a MIME-like message containing server information, entity information, and possible body content.

Most HTTP communication is initiated by a user agent and consists of a request to be applied to a resource on some origin server. On the internet, HTTP communication generally takes place over Transmission Control Protocol/Internet Protocol (TCP/IP) connections. The default port is TCP 80, but other ports can be used. Except for experimental applications, current practice requires that the connection be established by the client prior to each request and closed by the server after sending the response. Both clients and servers should be aware that either party may close the connection prematurely, due to user action, automated timeout, or program failure, and should handle such closing in a predictable fashion. In any case, the closing of the connection by either or both parties always terminates the current transaction, regardless of its status.

When a user displays a Hypertext Markup Language (HTML) page with their browser, it will typically contain references (links) to other pages/sources of information. These references are signified to the user by being highlighted. Upon clicking on one of the references, the client browser parses a Uniform Resource Locator (URL) to determine which internet based server it should attempt to connect to, and which URL it will be requesting from the server. The client then attempts to connect to the server on port 80. If this connection request is successful, the client sends in a request for the URL and waits for a response. When it receives the response, the client browser renders the retrieved information to the user. As stated above, once the server sends the requested information, it closes the connection and waits for requests. The client waits for the user to select another URL and the process begins again.

This application describes a tool (sometimes referred to hereinafter as a security injection program means or a security injection program) which allows a company, i.e., a website owner, to maintain a single set of HTML documents which can be served to multiple types of secure browser. This is done by adding security parameters automatically when a security-enabled browser makes a request.

First, a "security injection profile" is created, which profile defines the level of security desired for a set of pages of a company's web content. This set typically includes most of a company's HTML pages, as well as any image files that may be displayed on those pages. For example, the set may be defined as all files of a given type in a certain directory, such as web/pages/*html. To create the profile, the set of files is analyzed to determine all the hyperlinks (i.e., links) that it contains. These links include Uniform Resource Locators (URLs) and they point to other documents or other sites on the web. For the URLs of each HTML page that link to other pages within the secure set, security parameters may be added. Requests for pages in this set all belong to the same "session" and a security context for that session can be maintained as long as the browser remains within that secure set of pages. URLs that link to pages outside the set cannot be modified for security.

In the security injection profile, for each protocol there is a separate section to define security parameters for each page. Since browsers go "from" one page "to" another, there are corresponding "to" and "from" sections in the profile. There is a "to" section for each page which defines the default security parameters used when a browser goes "to" that page. Within each "to" section there may be multiple "from" sections, one for each page which contains a URL for that "to" page.

For example, suppose a company supports SHTTP protocol and has three web pages, HOME, A, and B. The resulting security injection profile (as shown in FIG. 3) contains three "to" sections, one for each page. Assuming the page HOME has a URL that links to page B, then there is a "from" section for page HOME within the "to" section for page B. The profile is implemented using HTML tags to be consistent with the application environment of HTML pages.

Since it is possible for every page to be both a "to" and a "from" page, the potential exists for the profile to be huge, in the order of N-squared where N is the number of pages. To avoid this problem in the preferred embodiment, defaults are defined for all "to" pages, and then only the "from" pages that do not use the defaults need to be listed separately. This significantly reduces the number of "from" entries in the profile.

Security parameters are defined for each to-from combination. There are many types of security parameters, and for illustration purposes we have selected two: Header and Cryptopts. For each "to" section there must be a default Header and Cryptopts parameter set defined. For each "from" section within a "to" section, there may be either Header or Cryptopts or both, as needed to override the defaults defined for the given "to" section.

Creating and modifying the profile may be done using a simple text editor, but this can be tedious and is prone to typing errors. Preferably, a browser-based front end displays the contents of the profile and allows the user to modify its content. The profile management software is capable of creating a profile from scratch, or modifying an existing profile based on changes made to the set of HTML pages.

Once all the to-from entries are defined in the profile, one change must be made to the set of HTML pages. Wherever a URL directly requests an HTML page that is in the security profile, it must instead invoke a security injection Common Gateway Interface (CGI) script (not shown) passing the names of the "from" and "to" pages as parameters. This script is the entry point to the security injection program.

FIG. 1 diagrammatically illustrates a plurality of browsers 10-1 to 10-4 coupled to a web server 12. A security injection program 14 accesses HTML pages from an information provider's secure set of pages 16; and, using security parameters from a security injection profile 18, the security injection program 14 dynamically assigns selected security parameters to each accessed page. The accessed pages 20, 22, 24 of differing security protocols (modified by the addition of their security parameters) are then given to the web server 12 for transfer to the requesting browsers 10-1 to 10-3.

Requests from a non-secure browser 10-4 may be processed by stripping secure portions from an accessed HTML page by providing the appropriate software in the process 14.

The profile 18 includes a plurality of profile sections 18a, 18b, and 18c for storing security parameters for browsers enabled with SHTTP protocol, another protocol, and SSL protocol, respectively.

Figure 2:
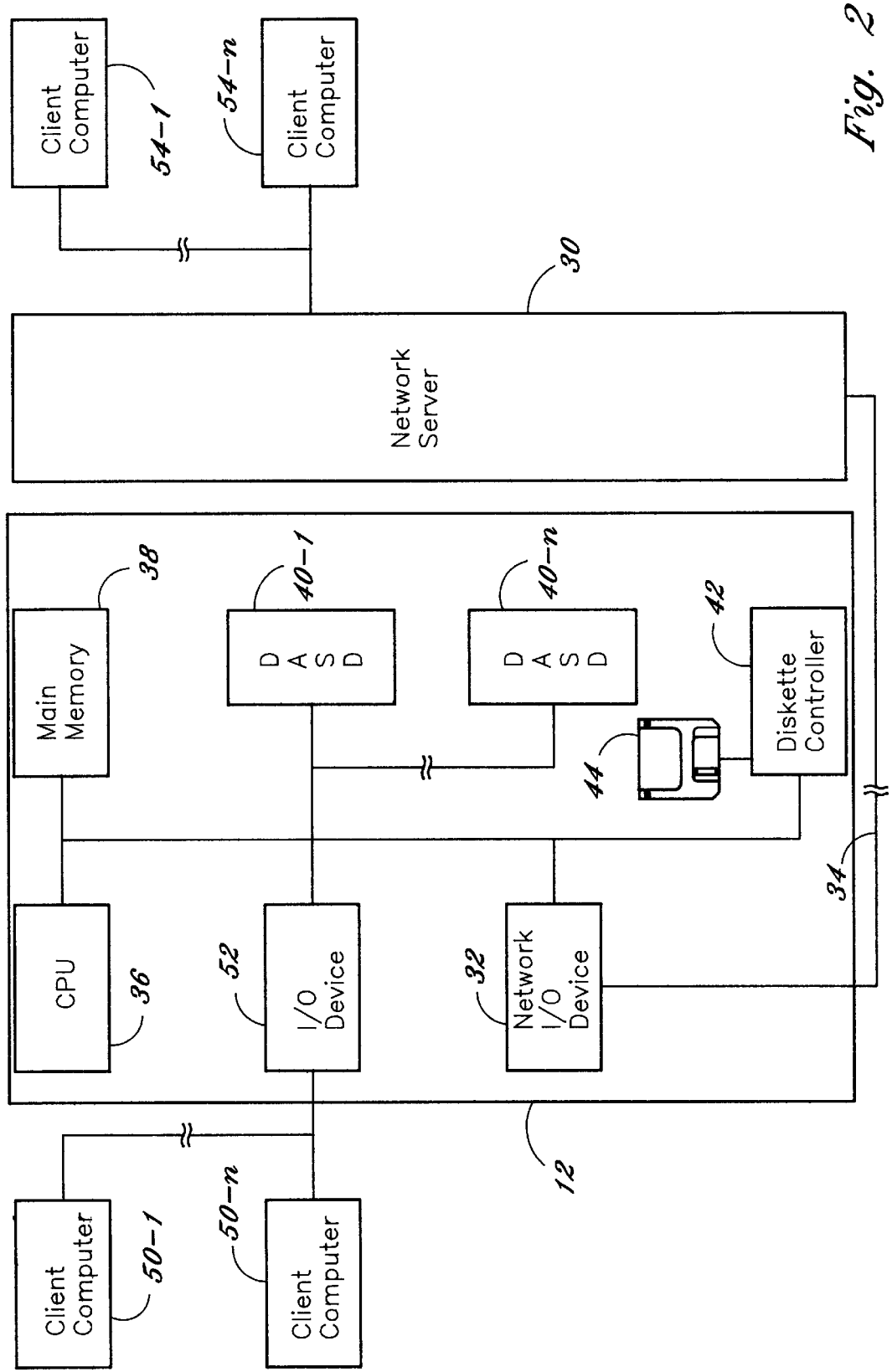
FIG. 2 illustrates diagrammatically a network system in which the present invention may be used.

FIG. 2 diagrammatically illustrates a portion of the world-wide web in its simplest form.

A pair of conventional network (or web) servers 12 and 30 are coupled to each other by way of respective network I/O devices such as 32 and a network path 34. Each server includes a central processing unit (CPU) 36, a main memory 38, a plurality of direct access storage devices (DASD) 40-1 to 40-n, and a diskette controller 42 receiving diskettes 44 for providing data and programs to the network system.

Network server 12 is coupled to conventional client computers 50-1 to 50-n by way of an I/O device 52. Network server 30 is coupled to its respective client computers 54-1 to 54-n.

A web provider may leave his set of secure HTML pages stored in DASD 40-1 and/or DASD 40-2 to 40-n. A portion of the set of HTML pages could be stored in corresponding DASDs in the server 20. The client computers such as 50-1 can access HTML pages throughout the entire worldwide web.

The security injection profile 18 is also stored in DASD 40-1 to 40-n. Each of the computers 50-1 to 50-n and 54-1 to 54-n may be enabled with one of the browsers 10-1 to 10-4 of FIG. 1.

FIG. 3 illustrates by way of example one preferred embodiment of a web security injection profile 18a storing security parameters Header and Cryptopts for browsers enabled with SHTTP security protocol. The profile 18a assumes that a web information provider has a set of three HTML pages HOME, A, and B.

The "to" sections for page HOME, page A, and page B have default values for "header" and "cryptopts" parameters. The page A "from" section of the "to" section for page HOME has an override header setting H1 and override cryptopts setting C1. The page HOME "from" section of the "to" section for page B has an override header setting H2 and an override cryptopts setting C2.

The profile 18a of FIG. 3 also defines the header and cryptopts settings default, H1, H2, C1, C2.

Figure 4:
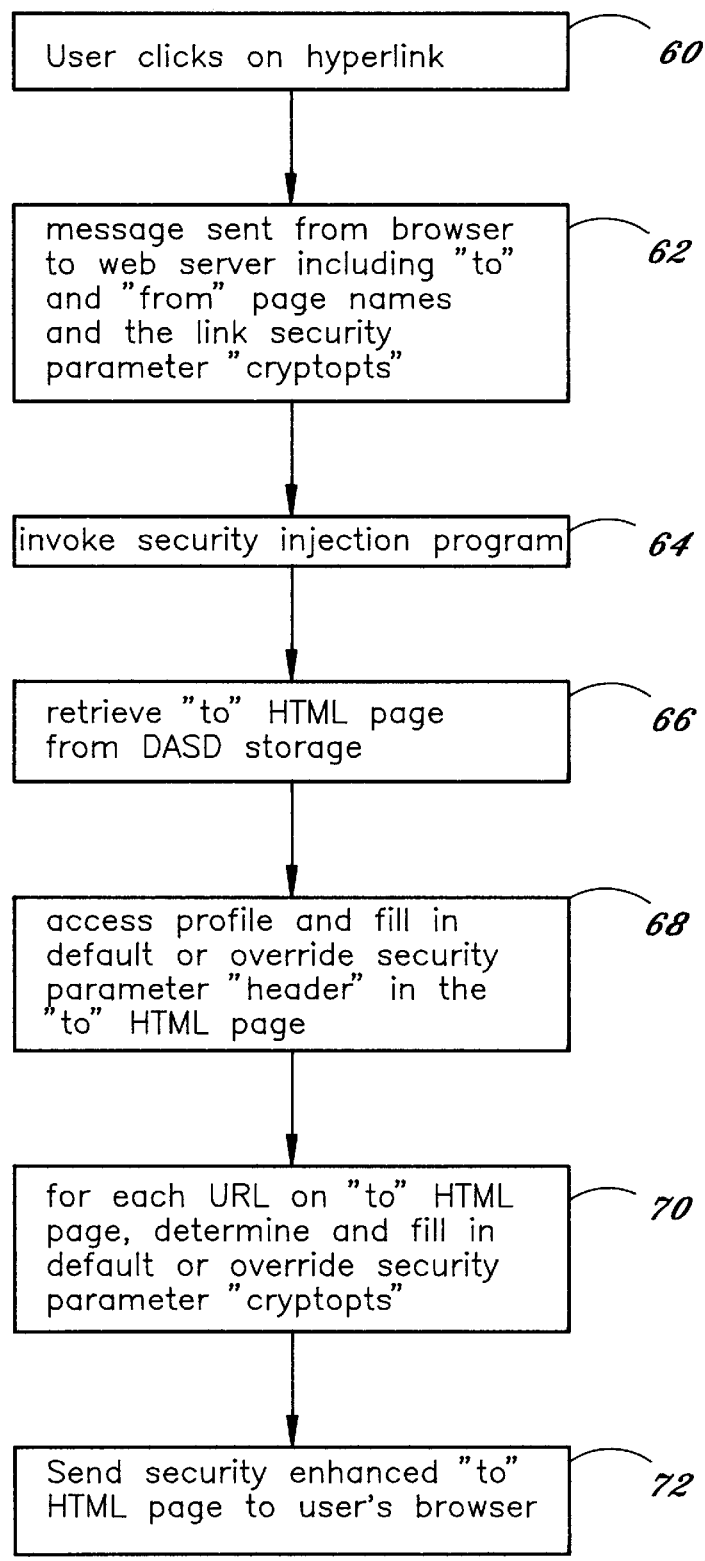
FIG. 4 is a flow chart illustrating the accessing of HTML pages from a file and injecting each page with SHTTP security parameters before providing the page to the security enabled browser which requested the page.

FIG. 4 illustrates the following steps which occur when a user clicks on a hyperlink to request an HTML page that requires security:

1. The user clicks on a hyperlink on the page ("from" page) that he is presently viewing, block 60.
2. The user's browser sends a message to the web server 12 including the "to" and "from" page names and a hyperlink security parameter, block 62.
3. The web server invokes the security injection program 14 via CGI script passing the names of the "from" and "to" pages and the type of security used, block 64.
4. The security injection program 14 reads the "to" page from a file, block 66.
5. The program 14 fills in the default or override security header for that page using the Header defined in the profile, block 68.
6. Next, set the default or override Cryptopts for each URL on the "to" page. To do this, note that once this "to" page is sent to the browser, it then becomes the "from" page for the next request. Therefore, determine the cryptopts to use by treating each URL as a future "to" request, and treating the current "to" page as the "from" page, block 70.
7. Once the URLs have been modified, the injection process is complete, the program 14 provides the modified page to the server 14, and the web server 14 then serves the security enhanced page back to the requesting browser, block 72.

In short, when a secure page is requested by a browser that supports security, the injection process modifies the appropriate parts of that page using the security parameters defined in the profile and serves it back to the browser. When a page is requested by a browser that does not support security, either the page is modified to remove secure sections or, if that is not possible, the user gets a page that says "a secure browser is required to view this page."

The security injection concept described in this application is a general purpose technique for dynamically assigning security parameters to an HTML page. We illustrated one possible implementation using the SHTTP security parameters Headers and Cryptopts, however the concept applies to other SHTTP security options as well. The security injection concept may be used with other security protocols such as Secure Sockets Layer (SSL). As future security protocols become available, the security injection technique may be employed with them as well. This can be done by expanding the security injection profile, adding a new section for each security protocol.

A specific example of the security injection process will now be described. Joe Client is using his web browser to view internet pages. He has selected a company's home page. This company uses the security injection program of the present invention to dynamically add security parameters to its web pages.

For the purposes of this example, the company has three pages, HOME.html, B.html, and A.html (FIG. 3). This example demonstrates what the security injection program of the present invention does when Joe moves "from" page HOME.html to page B.html. The same steps are taken for any of this company's pages that Joe selects.

The assumption is that the company provides at least one web page (the page HOME.html) that can be accessed directly by anyone in the internet. This page is hard coded, not tailored by the security injection program. This is the page Joe is currently viewing. It has a header which is fixed, and each link on the page has associated security parameters called cryptopts. To get to the company's other web pages, Joe clicks on a link which invokes the security injection program. The steps below describe how the security injection program 14 dynamically assigns security parameters to the next page and returns it to the client.

1. Joe is currently viewing the page HOME.html. He decides to click on a link that takes him to page B.html. Both pages belong to the company, so the security injection program can dynamically assign the security parameters on the next page (page B.html) served to Joe's browser.
2. The link Joe selected on the page HOME.html specifies the security injection program 14 as the program to invoke, and passes the name of the "from" page as HOME.html and the "to" page as B.html.
3. When Joe clicks on the link, his web browser sends a message to the company's web server 12, which invokes the security injection program 14, which reads the "from" and "to" parameters passed to it. Since the "to" page is B.html, the program reads page B.html from a file. This is a skeleton page, meaning the header and cryptopts have not been filled in yet. The purpose of the security injection program 14 is to fill these in.
4. Setting the header: The security injection program 14 looks in section 18a of the security injection profile 18 and finds the "to" section corresponding to the page B.html. This section of the profile contains the default header for the page B.html. Note that within the "to" section for page B.html is a "from" section for page HOME.html. This section specifies the header which overrides the default header. Since Joe came "from" HOME.html "to" B.html, this override section is used. This specifies header H2 should be used. The program 14 then adds header H2 to the page B.html, as specified by the override section in the profile.
5. Setting the cryptopts. Before the page B.html can be sent back to Joe's browser, the cryptopts for each link on page B.html must be filled in. To do this, the program goes back to the profile. During this process, the page B.html is treated as the "from" page and each link on B.html as the "to" page. This is because links on page B.html are "from" B.html "to" some other page. As an illustration, assume there is a link on page B.html that points to page A.html. In this case, the "to" page is A.html and the "from" page is B.html. In the profile, there is a "to" section for page A.html. This section specifies only default cryptopt settings for A.html, so these are inserted into the link for A.html on page B.html. If there were a "from" page B.html specifying an override "cryptopts" setting, this latter setting would have been inserted into the link for A.html on page B.html. This process repeats for each link on page B.html which points to a page belonging to the company.

6. Now the page B.html has been tailored according to the settings in the security injection profile. Its header is filled in as well as the cryptopts on each link to other pages. Now the security injection program has completed its job, and the page B.html is ready to be served back to the client.

7. The company's web server sends the modified page B.html back to Joe's browser where it is displayed. Joe's browser treats the page according to the security settings defined in the header section which was filled in by the security injection tool.

8. The preceding steps repeat for each "click" where Joe chooses one of the company's pages.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. In a computer system, a method for dynamically assigning security parameters to each one of a secure set of Hypertext Markup Language (HTML) pages as the pages are accessed, said method comprising the steps of:

storing information as HTML pages;

providing a security injection profile defining security parameters for said HTML pages for a plurality of security protocols;

receiving a request for a particular one of the HTML pages from a browser enabled with one of said security protocols;

retrieving said one requested HTML page;

accessing the security injection profile to obtain the security parameters for said one security protocol defined in the security injection profile for said one requested HTML page;

adding said obtained security parameters to said retrieved HTML page to produce a new version of the retrieved HTML page that conforms to said one security protocol; and delivering said new version of the retrieved HTML page to the browser.

2. The method of claim 1, wherein the security protocols include Secure Hypertext Transfer Protocol (SHTTP), and the security parameters defined for SHTTP in the security injection profile include Header and Cryptopts.

3. The method of claim 2, wherein for each of the HTML pages, the security injection profile includes a "to" section defining default Header and Cryptopts security parameters for the HTML page, and the "to" sections in the security injection profile further include one "from" section for each of the HTML pages that link to the HTML page corresponding to the "to" section if such linking requires other Header and Cryptopt security parameters to override the default Header and Cryptopts security parameters in the "to" section.

4. The method of claim 1, wherein the security protocols include Secure Sockets Layer (SSL).

5. In a computer network, a method for enabling a network information provider to maintain a single set of HTML pages that can be served to browsers that use differing security protocols, said method comprising the steps of:

storing information as a set of Hypertext Markup Language (HTML) pages;

providing a security injection profile defining security paramneters for a plurality of security protocols;

receiving a request for a particular one of the HTML pages from a browser that uses one of said security protocols;

retrieving said one requested HTML page;

accessing the security injection profile to obtain the security parameters for said one security protocol;

adding said obtained security parameters to said retrieved HTML page to produce a new version of the retrieved HTML page that conforms to said one security protocol; and delivering said new version of the retrieved HTML page to the browser for handling in accordance with the added security parameters.

6. The method of claim 5, wherein the security protocols include Secure Hypertext Transfer Protocol (SHTTP) and Secure Sockets Layer (SSL), and the security parameters defined for SHTTP in the security injection profile include Header and Cryptopts.

7. A system coupled through a network to client computers having differing security protocols enabled by browsers running thereon, said system comprising:

storage means for storing information of a network information provider as a single set of Hypertext Markup Language (HTML) pages;

at least one server coupled to the client computers and to the storage means, the web server delivering the HTML pages to the browsers in response to requests from the browsers; and security injection means for dynamically assigning security parameters to each HTML page delivered to one of the browsers in accordance with the security protocol enabled in the one browser, wherein said security injection means includes:

a security injection profile defining security parameters for each of the HTML pages for each of the security protocols;

means responsive to a request from one of the browsers for accessing a requested one of the HTML pages;

means for accessing the security injection profile to obtain the security parameters defined in the security injection profile for the requested one of the HTML pages and the security protocol of the browser making the request; and means for injecting the accessed security parameters into the accessed HTML page.

8. The system of claim 7, wherein for each of the HTML pages, the security injection profile includes a "to" section defining default security parameters for the HTML page, and the "to" sections in the security injection profile further include one "from" section for each of the HTML pages that link to the HTML page corresponding to the "to" section if such linking requires other security parameters to override the default security parameters in the "to" section.

9. In a computer network that includes client computers, storage means for storing information as HTML pages, and at least one server coupled to the storing means and the client computers, a method for dynamically assigning security parameters to each of the HTML pages that is delivered to one of the client computers in accordance with a type of security used by the one client computer to make requests and to receive results, said method comprising the steps of:

passing names of "from" and "to" pages and the type of security used by the one client computer to a security injection program;

having the security injection program read from a security injection profile a security header parameter defined for the "to" page and inject the defined header into the "to" page;

having the security injection program read from the security injection profile a security cryptopts parameter for each Uniform Resource Locator (URL) associated with the "to" page and set said cryptopts parameters in said "to" page to create a security enhanced "to" page; and sending the security enhanced "to" page to the one client computer, so as to allow only one set of HTML pages to be stored for retrieval by client computers using differing types of security.

10. A method for dynamically assigning security parameters to each one of a secure set of web pages as the web pages are accessed, said method comprising the steps of:

storing information as web pages;

providing a security injection profile defining security parameters for the web pages for a plurality of security protocols;

receiving a request for a particular one of the web pages from a client system enabled with one of the security protocols;

retrieving the one requested web page;

using the security injection profile to obtain the security parameters for the one security protocol defined in the security injection profile for the one requested web page;

adding the obtained security parameters to the retrieved web page to produce a security enhanced version of the retrieved web page; and delivering the security-enhanced version of the retrieved web page to the client system.

11. The method of claim 10, wherein the security protocols include Secure Hypertext Transfer Protocol (SHTTP), and the security parameters defined for SHTTP in the security injection profile include Header and Cryptopts.

12. The method of claim 11, wherein for each of the web pages, the security injection profile includes a "to" section defining default Header and Cryptopts security parameters for the web page, and the "to" sections in the security injection profile further include one "from" section for each of the web pages that link to the web page corresponding to the "to" section if such linking requires other Header and Cryptopt security parameters to override the default Header and Cryptopts security parameters in the "to" section.

13. The method of claim 10, wherein the security protocols include Secure Sockets Layer (SSL).

* * * * *